(12) United States Patent
Dorward et al.

(10) Patent No.: US 7,254,689 B1
(45) Date of Patent: Aug. 7, 2007

(54) DECOMPRESSION OF BLOCK-SORTED DATA

(75) Inventors: Sean M. Dorward, Martinsville, NJ (US); Sean Quinlan, Menlo Park, CA (US); Michael Burrows, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 462 days.

(21) Appl. No.: 10/892,988

(22) Filed: Jul. 15, 2004

(51) Int. Cl.
*G06F 12/00* (2006.01)
*G06F 13/00* (2006.01)
*G06F 13/28* (2006.01)

(52) U.S. Cl. .............. 711/168; 711/154; 711/167; 711/169; 710/61; 712/245; 712/246; 712/247; 712/248; 712/205; 712/206; 712/208; 712/214; 712/215; 712/233; 718/107; 718/108

(58) Field of Classification Search .......... 711/61, 711/168, 154, 167, 169; 712/245–248, 205–206, 712/208, 214–215, 233; 718/107–108
See application file for complete search history.

(56) References Cited

U.S. PATENT DOCUMENTS

| | | | |
|---|---|---|---|
| 6,119,120 A | 9/2000 | Miller | 707/101 |
| 6,640,283 B2 * | 10/2003 | Naffziger et al. | 711/118 |
| 6,735,673 B2 * | 5/2004 | Kever | 711/118 |
| 6,795,897 B2 * | 9/2004 | Benveniste et al. | 711/118 |
| 2004/0030847 A1 * | 2/2004 | Tremaine | 711/154 |

OTHER PUBLICATIONS

Jeff Gilchrist. "Parallel Data Compression with BZIP2".*
Burrows, M., et al., "A Block-Sorting Lossless Data Compression Algorithm," Digital Equipment Corporation, May 10, 1994, pp. 1-18.

* cited by examiner

*Primary Examiner*—Donald Sparks
*Assistant Examiner*—Prasith Thammavong
(74) *Attorney, Agent, or Firm*—Morgan, Lewis & Bockius LLP (57) ABSTRACT

In an embodiment of the present invention, the computational efficiency of decoding of block-sorted compressed data is improved by ensuring that more than one set of operations corresponding to a plurality of paths through a mapping array T are being handled by a processor. This sequence of operations, including instructions from the plurality of sets of operations, ensures that there is another operation in the pipeline if a cache miss on any given lookup operation in the mapping array results in a slower main memory access. In this way, the processor utilization is improved. While the sets of operations in the sequence of operations are independent of another other, there will be an overlap of a plurality of the main memory access operations due to the long time required for main memory access.

30 Claims, 8 Drawing Sheets

DECOMPRESSION OF BLOCK-SORTED DATA

BRIEF DESCRIPTION OF THE INVENTION

The present invention relates generally to decompressing block-sorted data. More specifically, the present invention relates a technique of decompressing block-sorted data with improved computational efficiency.

BACKGROUND OF THE INVENTION

A particular method of data compression, known as block-sorting compression or Burrows-Wheeler compression, operates by sorting all rotations of elements in a data block, selecting an element from each rotation based on its location in the rotated block and compressing a set of these elements using a compression mechanism. In terms of computational efficiency, this method is reasonably fast and often generates smaller compressed outputs than other techniques. Typically, the compression ratio (i.e., the ratio of the size of the original data to the size of the compressed output) achieved by block-sorting compression is increased when large data block sizes are compressed. Block-sorting compression is, therefore, often used to compress large data blocks.

In decompressing the compressed data, the sorting needs to be reversed. Unfortunately, amount of memory required to decode the large data block sizes is typically larger than the available cache memory in a computer system. For instance, block sizes of 200 KB to 4 MB are common, requiring in-memory data structures of about 1.2 MB to 16 MB for decoding, while cache memory of 512 KB to 1 MB is typical. As a consequence, a particular lookup operation during decoding often results in cache misses. For very large blocks of data, the cache miss rate may substantially exceed 50 percent. Since this lookup operation is executed many times during decoding, the resulting cache misses degrade the overall computational efficiency of the decompression operation.

There is a need, therefore, for a technique of decompressing block-sorted data with improved computational efficiency.

SUMMARY OF THE INVENTION

In one embodiment of the present invention, information in an array is accessed in a computer system to decode a set of encoded data and produce a set of decoded data. During decoding, a sequence of operations are performed a plurality of times. The sequence of operations includes invoking a plurality of lookup operations to access information in the array. The plurality of lookup operations are mutually independent. A plurality of main memory accesses, which are required to perform the plurality of lookup operations, are performed during overlapping time periods. The sequence of operations also includes performing a respective plurality of decoding operations using results of the plurality of lookup operations and identifying a new plurality of lookup operations based on results of the plurality of decoding operations.

In some embodiments, the decoding technique includes identifying N starting points within the array, where N is an integer greater than 1. N lookup operations are invoked to access information in the array. The N lookup operations are mutually independent operations and a plurality of main memory accesses required to perform the N lookup operations are performed during overlapping time periods. N decoding operations are performed using results of the N lookup operations. A new set of N lookup operations are identified based on results of the N decoding operations. The N lookup operations, the N decoding operations and identification of the new set of N lookup operations are repeated a plurality of times.

Additional variations on the apparatus and method embodiments are provided.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE EMBODIMENTS

Reference will now be made in detail to embodiments of the invention, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the present invention.

Figure 1:
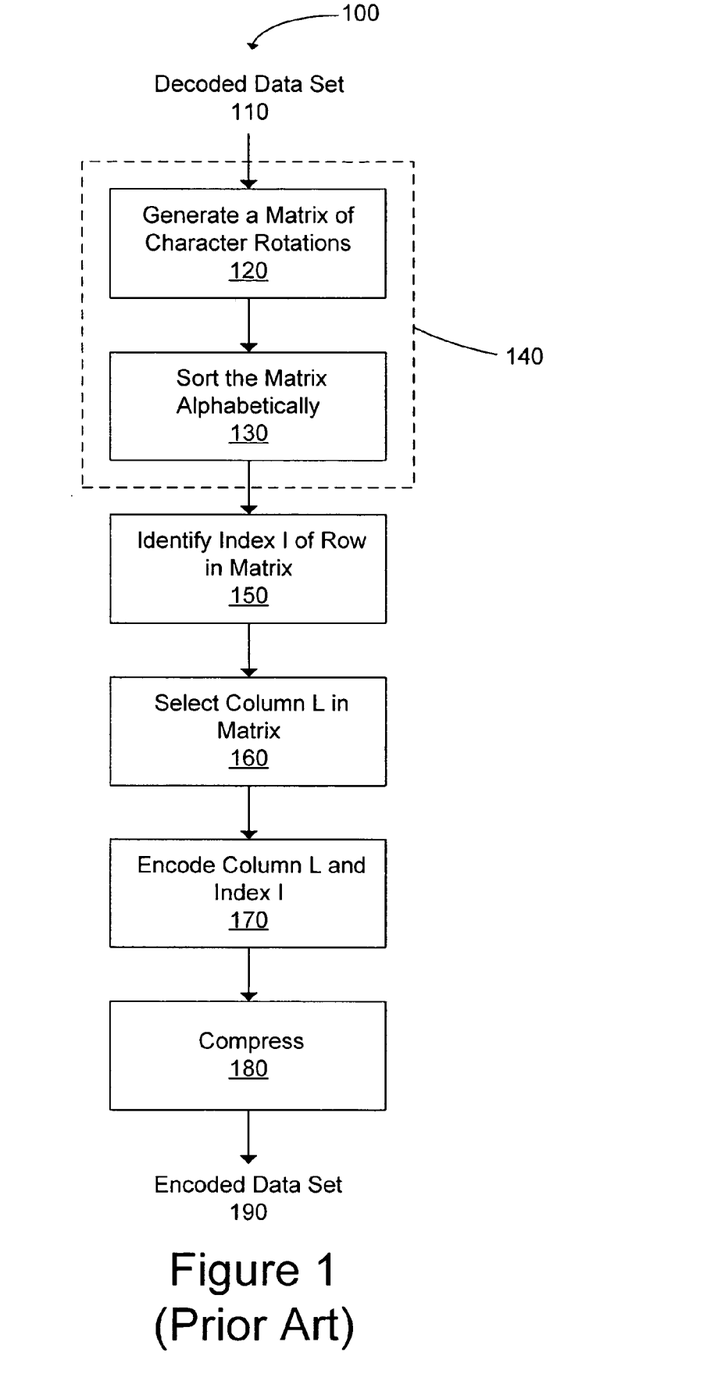
FIG. 1 is a flow diagram illustrating a technique of encoding data.

FIG. 1 illustrates a known block-sorting encoding technique 100 for compressing a data set 110. The data set 110 is sometimes called the "decoded" data set, because the inverse of the process shown in FIG. 1 produces a decoded data set that is the same as the data set 110. At least conceptually, all possible rotations of the data set (sometimes called cyclic shifts) are generated and arranged in a matrix 120, and the matrix is sorted alphabetically 130. There are, of course, computationally efficient ways to perform the functions corresponding to these two actions 140 without generating the entire matrix or manipulating the entire matrix during sorting. FIG. 1 and the other figures of this document should be viewed as conceptual illustrations.

An index I of a row in the matrix corresponding to the decoded data set 110 is identified 150. Thus, index I identifies the row of the matrix, after sorting, that is identical to decoded data set 110. A last column L in the matrix is selected 160, and the index I and the column L are encoded 170 and compressed 180 generating an encoded data set 190.

The method of FIG. 1 is sometimes called the Burrows-Wheeler data compression method.

Figure 3:
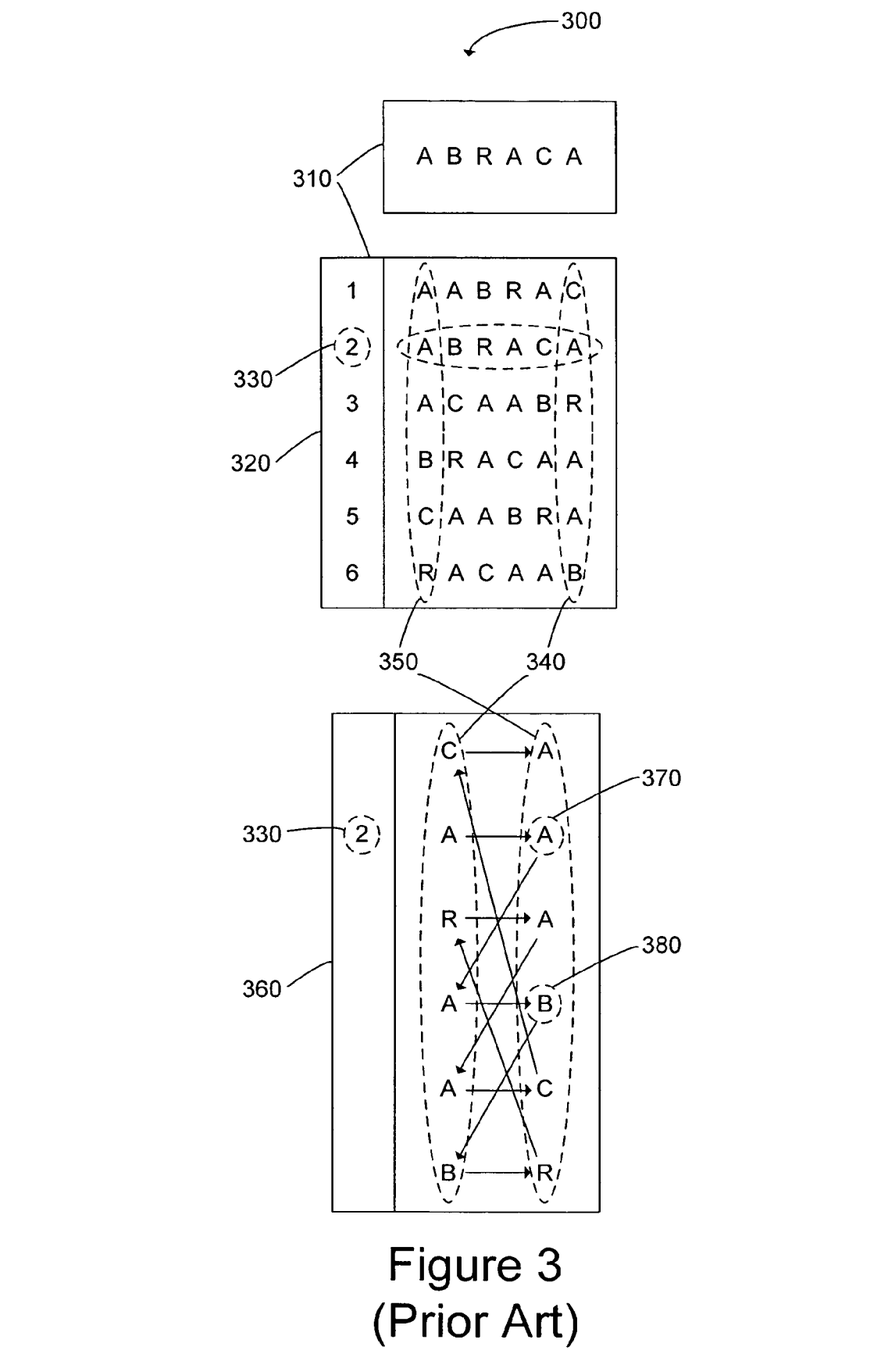
FIG. 3 is a block diagram illustrating data structures used while encoding and decoding data.

FIG. 3 illustrates data structures 300 used in the encoding technique 100. The decoded data set 110 may be a string of letters 310. In this case, an alphabetically sorted matrix 320 of a set of character rotations of the string 310 has 6 columns and 6 rows. A second row corresponds to the string 310. Therefore, the index I 330 is 2. Each row of the matrix 320 is a rotation of the original string, and each column is a permutation of its characters. In particular, the first column F 350 is the sorted permutation.

Referring back to FIG. 1, the encoding technique 100 is sometimes called Burrows-Wheeler compression. A more detailed description of Burrows-Wheeler compression is provided in M. Burrows and D. J. Wheeler, "A block-sorting lossless data compression algorithm," SRC Research Report 124 (1994), the contents of which are hereby incorporated by reference. Encoding stage 170 includes techniques such as move-to-front coding. Compression 180 includes techniques such as Huffman coding, arithmetic coding and run-length-limited coding. The encoding technique 100 is reasonably fast and often generates an encoded data set 190 that is smaller than that obtained with many other techniques. Typically, the compression ratio (i.e., the ratio of the size of the original data 110 to the size of the compressed output 190) increases as the size of the decoded data set 110 increases. Block-sorting compression is, therefore, often used to compress large data sets.

Figure 2:
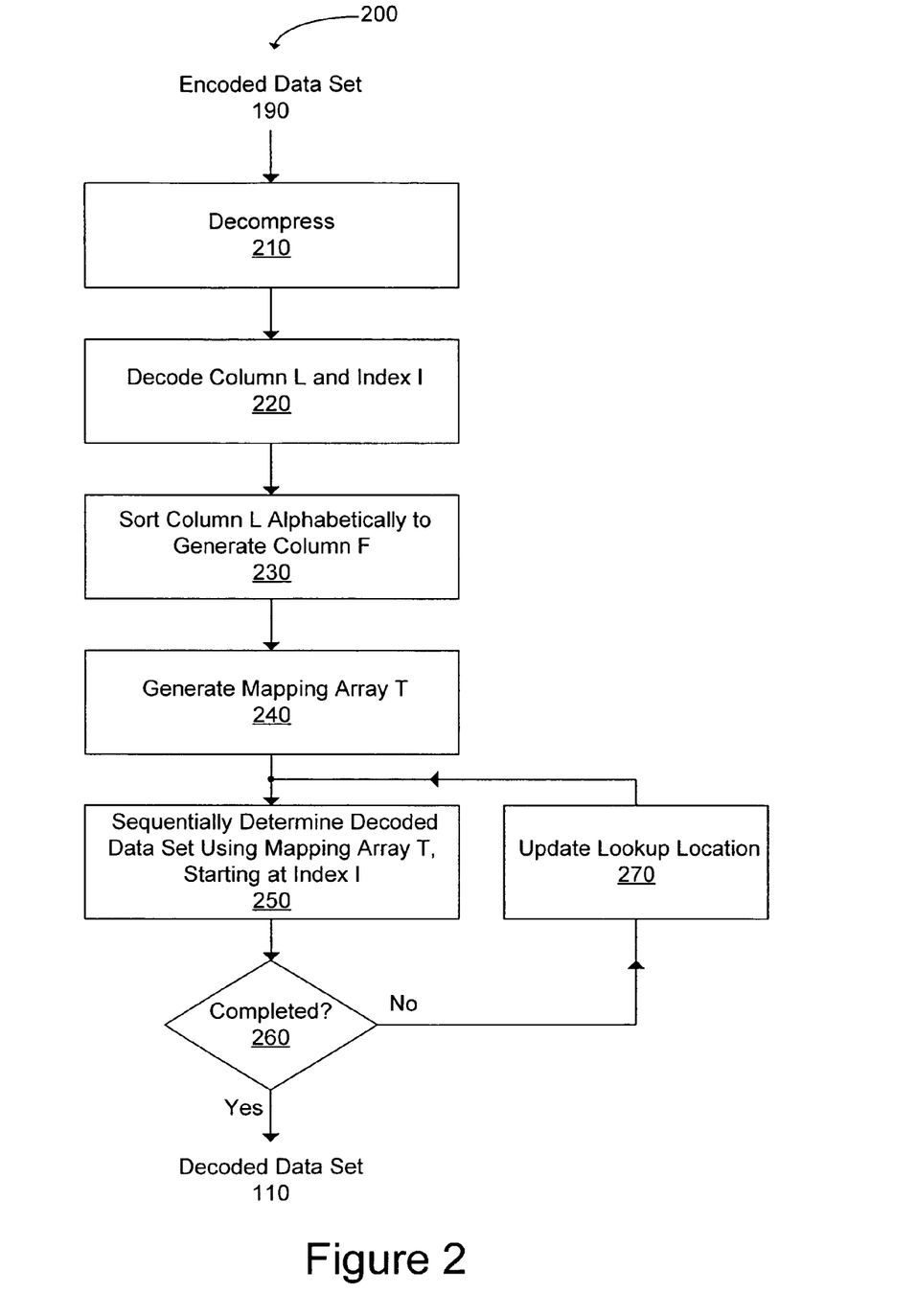
FIG. 2 is a flow diagram illustrating a technique of decoding data.

FIG. 2 illustrates a block-sorting decoding technique 200 for decompressing the encoded data set 190, such as that used in Burrows-Wheeler compression. The encoded data set 190 is decompressed 210, and the column L 340 and the index I 330 are decoded 220. Column F 350 is then generated 230 by alphabetically sorting column L 340. Next, a mapping array T is generated 240 from columns F 350 and L 340. Finally, in an iterative procedure (250, 260, 270), the decoded data set 110 is sequentially determined 250 using the mapping array T starting at the index I 330. After each iteration, if the decoding is completed 260 the result is the decoded data set 110. If the decoding is not completed 260, a lookup location is updated 270 based on the results of the lookup operation formed at 250, and then another element in the decoded data set 110 is sequentially determined 250. One well known implementation of the method shown in FIG. 2 is documented in the Burrows, Wheeler publication identified above. The present invention provides an improved implementation, with improved computational efficiency.

The data structures 300 used in the decoding technique 200 are illustrated in FIG. 3. A mapping array T 360 is derived from the column L 340 and the column F 350. There are, of course, many ways to generate the mapping array T 360. For example, a first column could be the column F 350 and a second column could be the column L 340. Alternatively, the mapping array T 360 may only contain a list of lookup locations in the column L 340 or the column F 350.

Using the example shown in FIG. 3, starting at row 2 (which is the index I 330 in this example) the decoded data set 110 is sequentially determined. A first character 370 (located at row 2, column 2 of the mapping array T 360) in the decoded data set 110 is looked up. A lookup location, also referred to as a pointer or an offset, to another row (in this case row 4) in the mapping array T 360 leads to a second character 380 (located at row 4, column 2 of the mapping array T 360). The procedure is repeated until the decoding is completed. Note that the traversal of the mapping array T 360 needs to be performed in order: a new lookup location is not known until you have determined a previous location or value. In addition, a location of a character in the decoded data set 110 is unknown unless its location relative to the index I 330 is specified.

Since the decoded data set 110 is typically large in size, it is larger (and often, much larger) than a cache memory in a computer system performing the decoding technique 200. As a consequence, lookup operations in the mapping array T 360 during the decoding technique 200 often result in cache misses. Since these lookup operations are executed many times during the decoding technique 200, the resulting cache misses degrade the overall computational efficiency. (Note that merely reducing the size of the decoded data set 110 is self-defeating. While the computational efficiency of the decoding technique 200 is improved, the cost is a lower compression ratio.)

Figure 4:
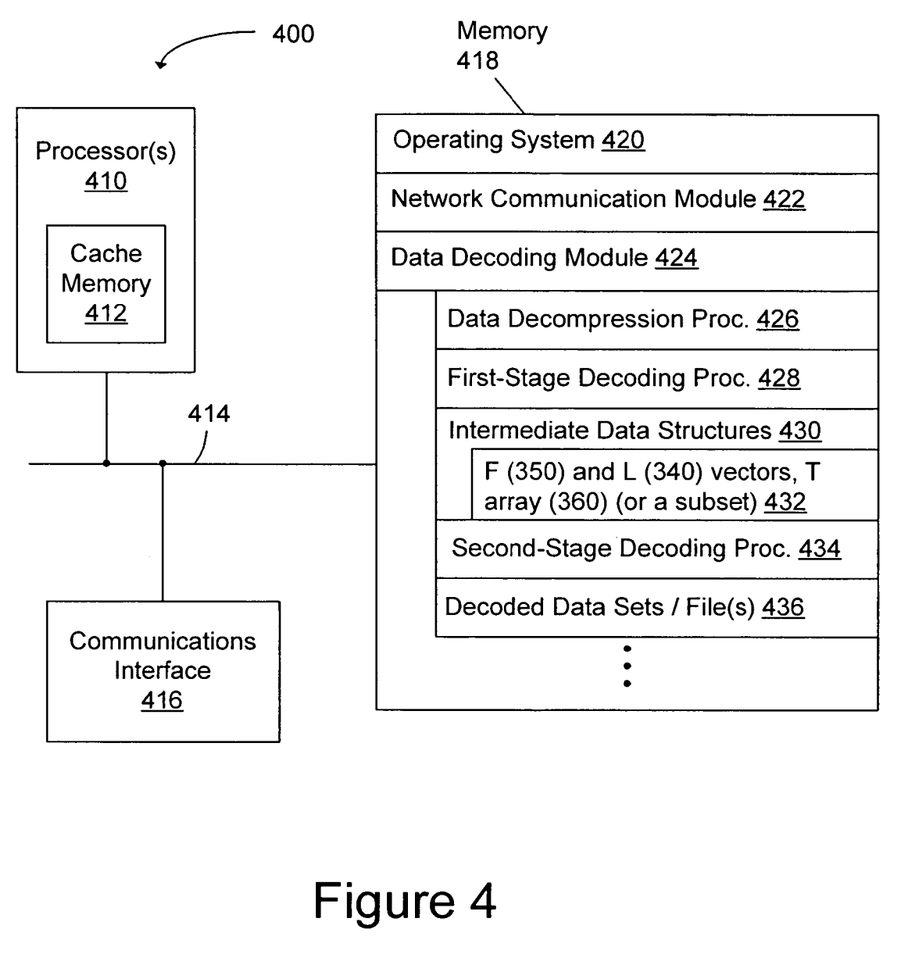
FIG. 4 is a block diagram illustrating a computer system in an embodiment of the present invention.

FIG. 4 illustrates a computer system 400 having one or more processors 410, including a cache memory 412, one or more communications interfaces 416 and memory 418. These components are interconnected by one or more communication busses 414. Memory 418 may include high speed random access memory and may also include non-volatile memory, such as one or more magnetic disk storage devices. Memory 418 stores:

an operating system 420 that includes procedures for handling various basic system services and for performing hardware dependent tasks;

a network communication module (or instructions) 422 that is used for connecting the computer 400 to other computers via the one or more communication interfaces 416; and a data decoding module 424.

The data decoding module 424 includes a data decompression procedure 426, a first-stage decoding procedure 428, intermediate data structures 430, a second-stage decoding procedure 434 and decoded data sets or files 436. The intermediate data structures 430 include the column F vector 350, the column L vector 340 and the mapping array T 360, or a subset of the column F vector 350, the column L vector 340 and the mapping array T 360, shown collectively at 432. The data decompression procedure 426 corresponds to stage 210 of FIG. 2. The first-stage decoding procedure 426 corresponds to stages 220, 230 and 240 of FIG. 2, and may include use of techniques such as move-to-front decoding. The second-stage decoding procedure 434 corresponds to a reversal of the sorting used during encoding. In the present invention, an improved second-stage decoding procedure 434 is provided, as described below.

The computational efficiency of decoding of block-sorted compressed data is improved by performing the second-stage decoding procedure 434 on the encoded data set 190 using more than one sequential path through the mapping array T 360. The parallel paths are independent of one another. The technique takes advantage of the capability of modern processors 410 to execute instructions in parallel (i.e., during overlapping time periods) when the instructions do not conflict with one another, i.e., if they do not access a common register or access registers that depend on one another.

There is always a finite probability of a cache hit during a cache access operation, i.e., that the desired information being looked up in the mapping array T 360 is in the cache 412. However, the probability of a cache miss increases when the size of the decoded data set 110 is significantly larger than a size of the cache 412, for example, at least 2 times larger. When the size of the decoded data set is at least 10 times as large as the cache 412, or at least 100 times as large as the cache 412, the probability of a cache hit during the mapping array lookup (stage 250, FIG. 2) of the decoding procedure becomes quite small. When the lookup operation in the mapping array T 360 results in a cache miss, main memory is accessed. Accessing main memory takes much more time than accessing the cache 412. Each time a mapping array lookup causes a cache miss, a stall condition results in the processor because the subsequent operations rely on the result of the mapping array lookup.

In some embodiments, the computational efficiency of the decoding procedure is improved by ordering the instructions of the second-stage decoding procedure 434 so that two or more mapping array lookups, corresponding to two or more independent paths through the mapping array T 360, are handled in parallel by the processor 410. This sequence of operations ensures that there is another operation in the processor's instruction pipeline if a cache miss on any given lookup operation results in a main memory access. In this way, the processor 410 utilization is improved.

For example, the second-stage decoding procedure 434 may traverse four distinct paths through the mapping array T 360, each having its own starting point. To do this, four mapping array lookups are invoked together, using sequentially arranged instructions or instructions that are very close to each other. As a result, when these instructions result in cache misses, the resulting main memory access operations are performed during overlapping time periods. In processors in which two or more independent instructions can be executed in parallel (i.e., in overlapping time periods), at least two of the multiple mapping array lookups are performed in parallel, regardless of whether the lookups result in cache misses. Therefore the second stage decoding procedure 434 improves efficiency by presenting the processor 410 (FIG. 4) with several independent loads at a time, allowing it to achieve parallelism wherever its architecture permits.

Figure 5:
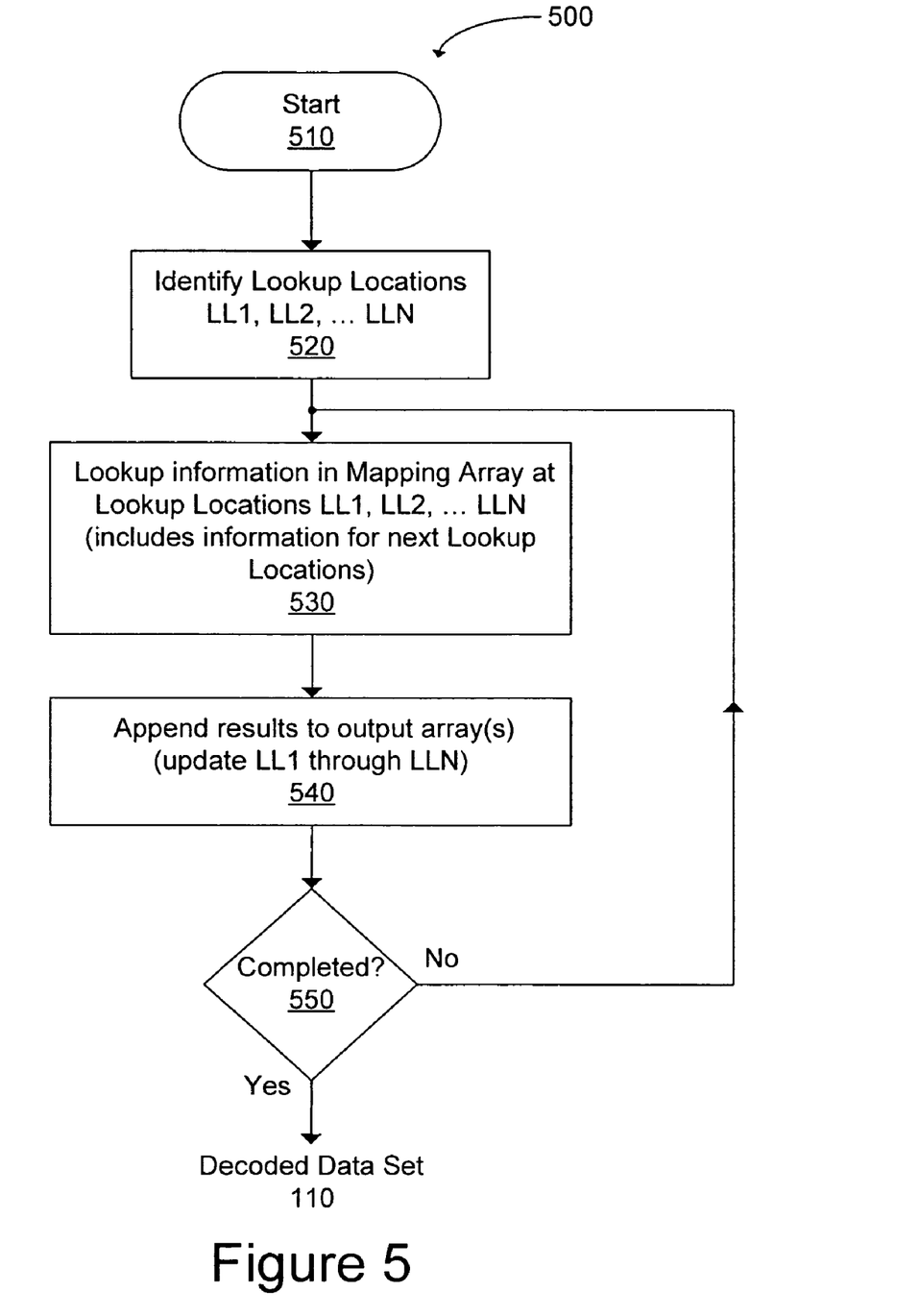
FIG. 5 is a flow diagram illustrating a method of decoding data.

FIG. 5 illustrates an embodiment of an improved decoding technique 500 in of the present invention. Upon starting 510, N initial lookup locations or starting points LL1 through LLN are identified 520 in the mapping array T 360. Next, information in the mapping array T 360 is looked up 530 in parallel at lookup locations LL1 through LLN. The information accessed includes next lookup locations for the lookup locations LL1 through LLN. The information is appended 540 to an output array(s). If necessary, the lookup locations LL1 through LLN are updated as well. In some embodiments, the lookup locations LL1 to LLN is updated at 530, while in other embodiments the lookup operations at 530 merely provide the information needed to update locations LL1 to LLN.

If the decoding is completed 550, the output array provides the decoded data set 110. If necessary, the output arrays may be combined to provide the decoded data set 110. If the decoding is not completed 550, information in the mapping array T 360 is looked up 530 at the new lookup locations LL1 through LLN.

In one embodiment of the present invention, the N initial lookup locations in the mapping array T 360 correspond to N substantially evenly spaced locations in the decoded data set 110. For example, N−1 locations in the decoded data set 110 may be included along with the index I 330 in the encoded data set 190. One of these N initial lookup locations is used in each of N parallel paths through the mapping array T 360. N is an integer greater than 1. N may be an even integer, including 2, 4, 6, 8, 16, 32, 64 and 128. When the N locations are included in the encoded data set 190, the N locations will typically be selected so as to divide the decoded data into N sets of substantially equal size. As discussed in more detail below, when only 1 of the N locations is included in the encoded data set 190, the other N−1 locations are selected by the data decoding module.

Figure 8:
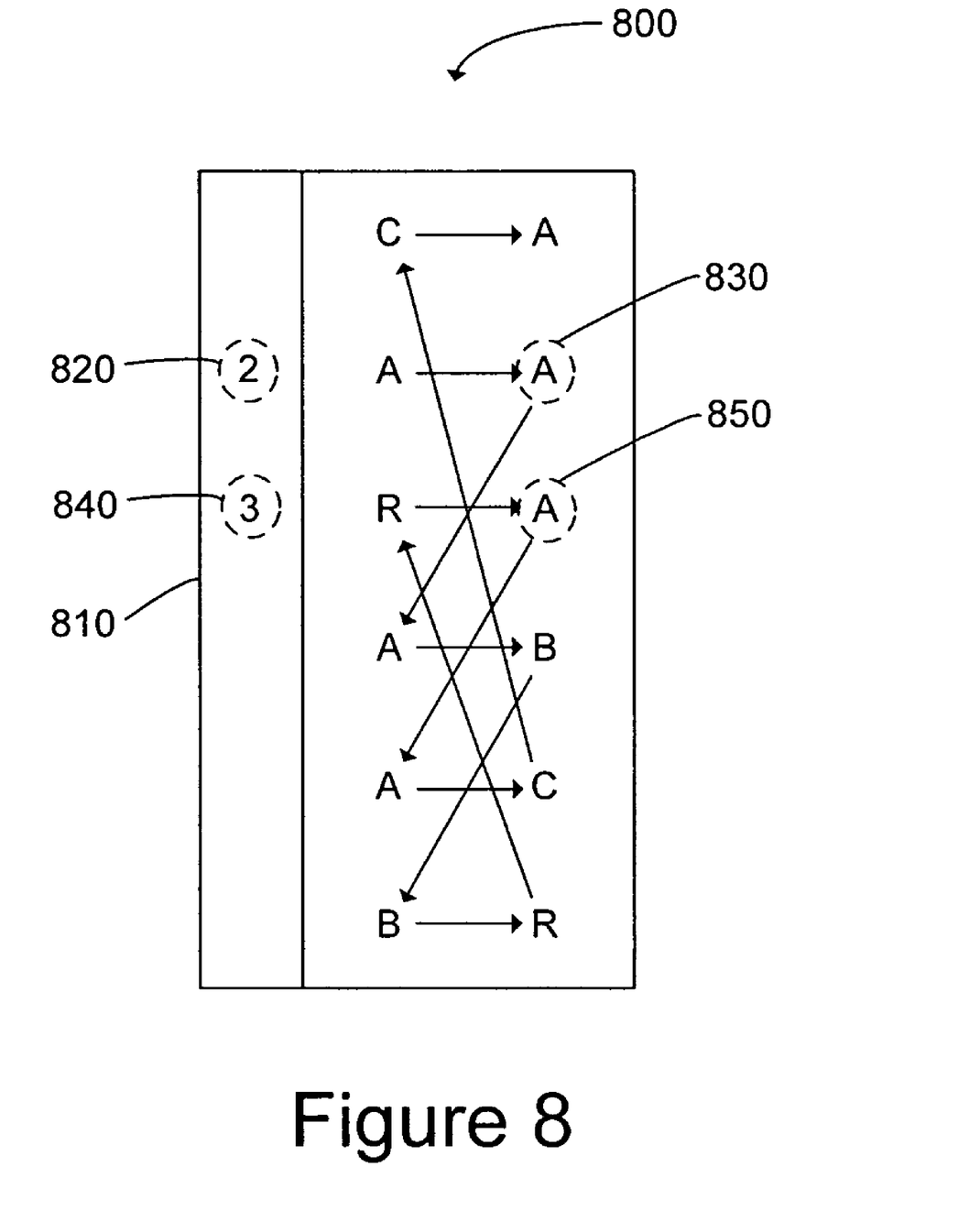
FIG. 8 is a block diagram illustrating a data structure used in decoding data in an embodiment of the present invention.

FIG. 8 illustrates a data structure 800 in an embodiment of the present invention. Accessing the mapping array T 810 at row 820 corresponding to index I 330 results in a lookup of the first character 830 in the decoded data set 110. Accessing the mapping array T 810 at row 840 results in a lookup of the fourth character 850 in the decoded data set 110. In this illustration there are therefore two independent, parallel, sequential paths through the mapping matrix T 810.

Figure 7:
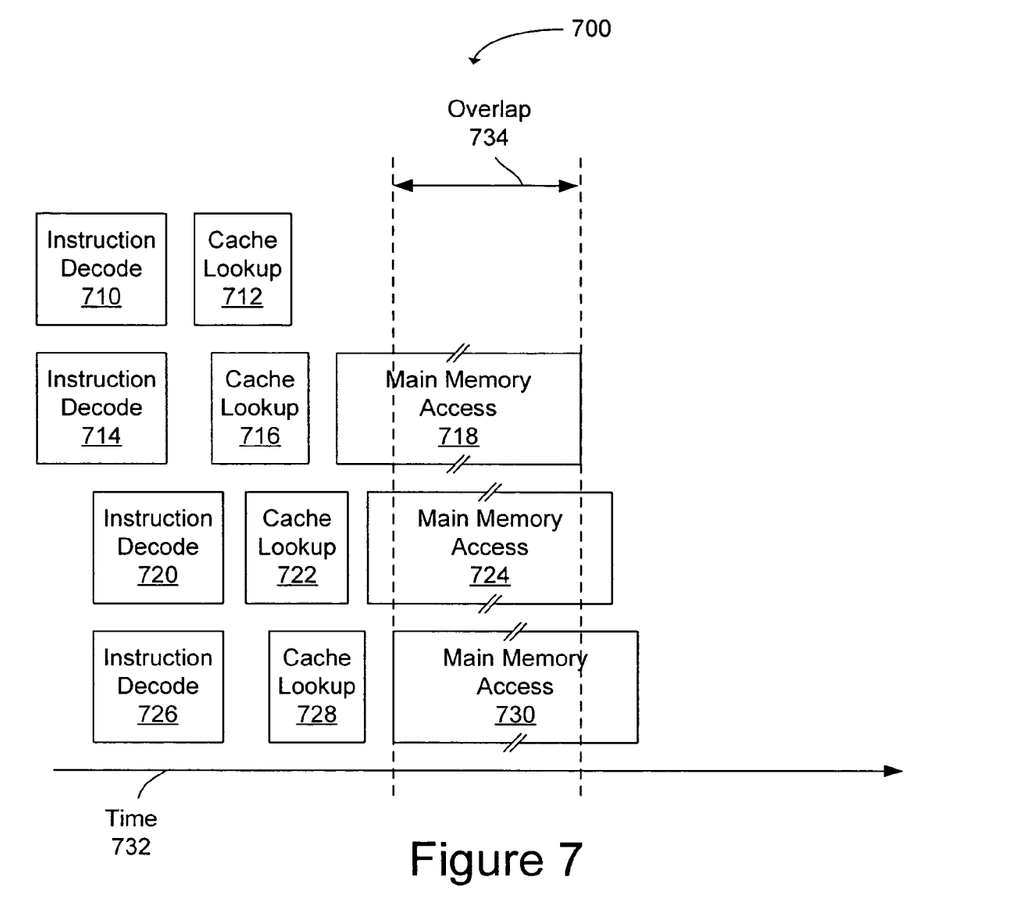
FIG. 7 is a block diagram illustrating timing of operations performed during decoding data in an embodiment of the present invention.

FIG. 7 illustrates operations 700 performed as a function of time 732 in an another exemplary embodiment with four parallel paths during decoding of encoded data 190. Instructions 710, 714, 720 and 726 to decode portions of the encoded data set 190 in the four parallel paths using the mapping array T 810 result in cache lookup operations 712, 716, 722 and 728. In this example, cache lookup 712 is a cache hit and is processed quickly. Cache lookups 716, 722 and 728 are cache misses and require main memory access operations 718, 724 and 730. As noted above, these four operations can be executed by the processor in parallel, or at least during overlapping time periods, because they are independent, non-conflicting operations. Since main memory accesses take much longer than cache accesses, there is an overlap 734 of the main memory access operations 718, 724 and 730. Therefore the average cache miss time "penalty" associated with the lookup operations is substantially reduced.

Figure 6:
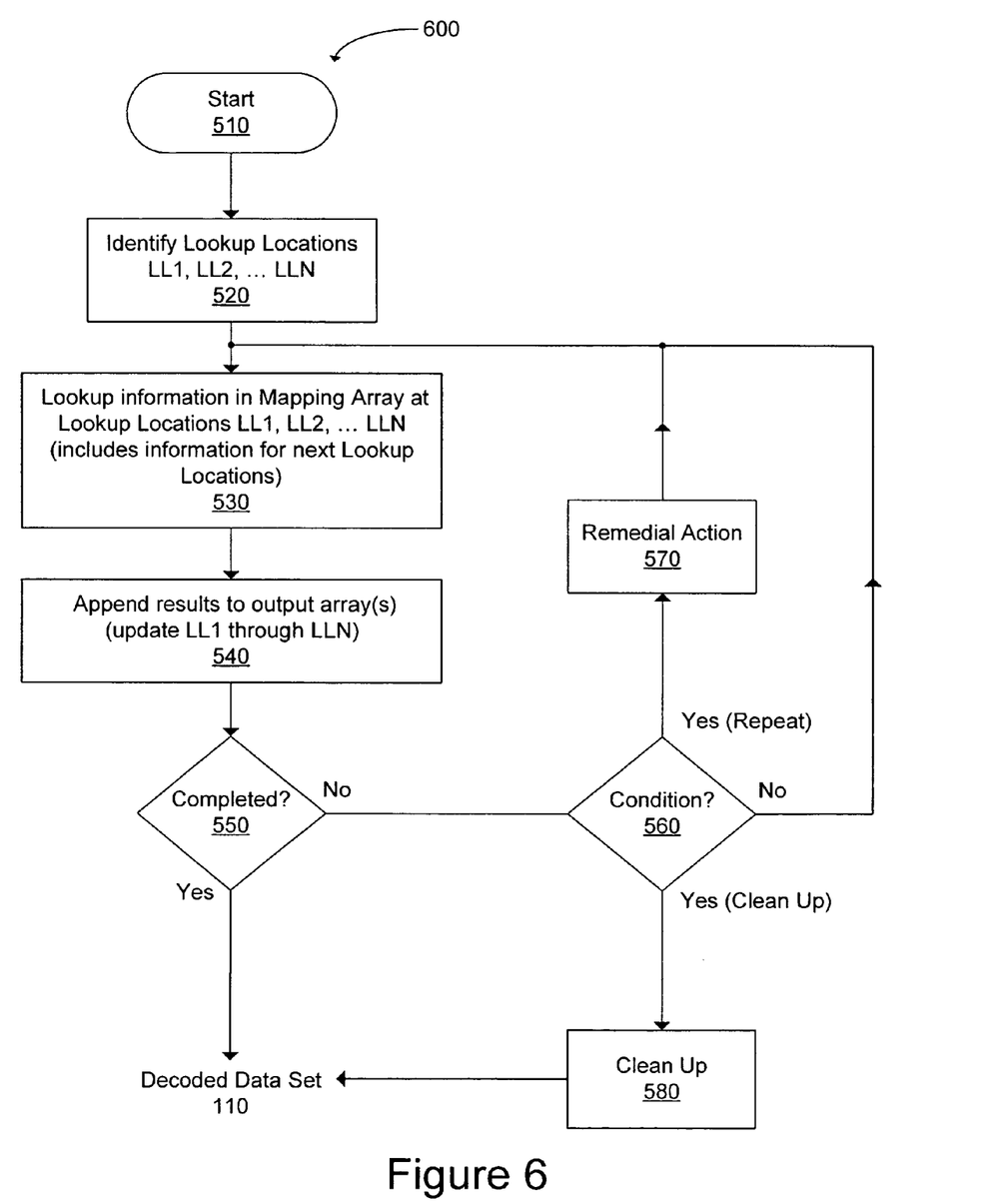
FIG. 6 is a flow diagram illustrating another method of decoding data.

FIG. 6 illustrates additional embodiments of a decoding technique 600 in the present invention. In one embodiment, if the decoding is not completed 550 a condition 560 is checked. If the condition 560 determines that the decoding is completed except for a few residual elements, a cleanup 580 routine is invoked to finish the decoding. Residual elements will occur if the size of the decoded data set 110 is not an integer multiple of N. The cleanup 580 routine handles the decoding of up to N−1 elements. Since this is a tractable number, the time penalty is small and the cleanup routine 580 need not be performed in parallel.

Table I includes pseudo-programming code for an embodiment of the present invention. The output array is initialized and the lookup locations LL1 through LLN are identified 520. In a loop, new lookup locations LL1 through LLN and information at existing lookup locations LL1 through LLN are accessed 530. The information at existing lookup locations LL1 through LLN are appended 540 at corresponding locations in the output array. If the decoded data set 110 is not a multiple of N, residual elements are decoded in the cleanup routine 580. Note that implementation of embodiments in the present invention may be hardware specific. Therefore, it may be beneficial to write the code in a low-level language.

TABLE I

Pseudo-programming code for an embodiment of the present invention.

Initialize Output( )
Identify LL1 through LLN // 520
Loop until end {
    LL1, A1 = Lookup(LL1) // 530
    ...
    LLN, AN = Lookup(LLN) // 530
    Append A1 through AN to Output( ) at corresponding locations // 540
}
Optional: Cleanup Routine // 580
End In an exemplary embodiment of the present invention, a number of parallel paths N is 4. This results in a decoding process that is approximately twice as fast as a decoding process that does not use the parallel lookup operation technique. In one case, a total decoding time (from encoded data set 190 to decoded data set 110) decreased from approximately 11 seconds to 5.5 seconds and a time spent traversing the mapping array T 360 and the column L 340 dropped from approximately 10 seconds to 4.5 seconds.

FIG. 6 also illustrates another embodiment of the present invention. The index I 330 may be encoded in the encoded data set 190. An additional N−1 initial lookup locations with unknown locations in the decoded data set 110 may be selected, for example, in a random or pseudo-random manner. In this embodiment, intermediate outputs are stored separately. The intermediate outputs can only be combined to obtain the decoded data set 110 once their relative locations in the decoded data set 110 are known, i.e., when their location relative to the index I 330 is known. In general, this will only be possible for all of the intermediate outputs when the decoding is completed. This embodiment is backwards compatible with existing programs such as BZIP2, a data encoding utility.

In this embodiment, the paths through the mapping array T 360 may eventually overlap other paths. For example, the path whose first lookup location corresponded to the index I 330 may overlap another one of the paths whose first lookup location was selected by the data decoding module. If the condition 560 is detected, remedial action is taken 570. For example, when the end of a first path overlaps the beginning of a second path, the remedial action 570 may be to end processing of the first path and to start processing a new path, with a new initial lookup position. Alternatively, the remedial action may be to reduce the number of parallel paths by one. As a result, the number of parallel paths may be progressively reduced as such overlaps occur until there is only one path remaining or the decoding is completed.

For every way of traversing the mapping array T 360 there is a corresponding way to traverse it in parallel subsections. In some embodiments, the encoded data set 190 is decoded from front to back and in other embodiments it is decoded from back to front.

The improved block-sorted data decoding technique in the present invention may also be applied to decode two or more separate files, data blocks or sets of data in parallel. In other words, the initial data set 110 may comprise two or more files, data blocks or sets of data that were compressed and encoded either separately or together. Alternatively or in addition, multiple processors 410 could be used, with each processor 410 handling a separate parallel path.

The foregoing descriptions of specific embodiments of the present invention are presented for purposes of illustration and description. They are not intended to be exhaustive or to limit the invention to the precise forms disclosed. Rather, it should be appreciated that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of decoding data, comprising:
    accessing information in an array to decode a set of encoded data and produce a set of decoded data, including performing a sequence of operations a plurality of times, the sequence of operations including:
        invoking a plurality of lookup operations to access information in the array, wherein the plurality of lookup operations are mutually independent operations and a plurality of main memory accesses required to perform the plurality of lookup operations are performed during overlapping time periods;
        performing a respective plurality of decoding operations using results of the plurality of lookup operations; and
        identifying a new plurality of lookup operations based on results of the plurality of decoding operations.

2. The method of claim 1, including generating the array of information.

3. The method of claim 1, wherein each respective lookup operation of the plurality of invoked lookup operations causes a main memory access of the plurality of main memory accesses when the information in the array to be looked up causes a cache miss.

4. The method of claim 1, wherein the invoking of the plurality of lookup operations includes invoking more than two lookup operations during the performance of each instance of the sequence of operations.

5. The method of claim 1, including:
    identifying N starting points within the array, where N is an integer greater than 1;
    invoking N lookup operations to access information in the array, the N lookup operations are mutually independent operations and the plurality of main memory accesses required to perform the N lookup operations are performed during overlapping time periods;
    performing N decoding operations using results of the N lookup operations;
    identifying a new set of N lookup operations based on results of the N decoding operations; and
    repeating the invoking, decoding and identifying a plurality of times.

6. The method of claim 1, wherein the encoded data includes a plurality of distinct sets of data.

7. The method of claim 1, wherein a computer-readable memory directs a computer system to perform the method.

8. A computer-implemented method of decoding data, comprising:
    performing N computations, where N is an integer greater than 1, so as to independently decode N distinct portions of a set of encoded data, each of the N computations comprising performing, a plurality of times, a set of operations including:
        invoking a lookup operation to access information in an array at a lookup location;
        performing a respective decoding operation using a result of the lookup operation;
        appending a result of the decoding operation to an output set; and
        identifying a new lookup location based on the result of the decoding operation;
    wherein the N computations are interleaved such that when a plurality of the lookup operations of the N computations result in cache misses, main memory accesses for completing the plurality of lookup operations are performed during overlapping time periods.

9. The method of claim 8, including generating the array of information.

10. The method of claim 8, wherein the set of encoded data includes data from a plurality of distinct sets of data.

11. The method of claim 8, including identifying N starting points corresponding to first lookup locations for the N computations.

12. The method of claim 8, wherein the data to be decoded includes information identifying N starting points corresponding to first lookup locations for the N computations.

13. The method of claim 12, wherein the N starting points correspond to known locations in a decoded data set produced by the method.

14. The method of claim 8, wherein the data to be decoded includes information identifying a first starting point corresponding to a first lookup location for a first one of the N computations, the method including selecting N−1 starting points corresponding to first lookup locations of N−1 of the N computations in accordance with predefined criteria.

15. The method of claim 14, wherein the N−1 starting points correspond to unknown locations in a decoded data set produced by the method.

16. The method of claim 8, wherein the method is backwards compatible with bzip2.

17. The method of claim 8, wherein a computer-readable memory directs a computer system to perform the acts in the method.

18. A computer-program product for decoding data for use in conjunction with a computer system, the computer-program product comprising a computer-readable storage medium and a computer-program mechanism embedded therein, the computer-program mechanism comprising:
  instructions for accessing information in an array to decode a set of encoded data and produce a set of decoded data, including instructions for performing a sequence of operations a plurality of times, the instructions for the sequence of operations including:
    instructions for invoking a plurality of lookup operations to access information in the array, wherein the plurality of lookup operations are mutually independent operations and a plurality of main memory accesses required to perform the plurality of lookup operations are performed during overlapping time periods when the computer system performing the instructions is capable of performing main memory access operations during overlapping time periods;
    instructions for performing a respective plurality of decoding operations using results of the plurality of lookup operations; and
    instructions for identifying a new plurality of lookup operations based on results of the plurality of decoding operations.

19. The computer-program product of claim 18, including instructions for generating the array of information.

20. The computer-program product of claim 18, wherein the instructions for each respective lookup operation of the plurality of invoked lookup operations cause a main memory access of the plurality of main memory accesses when the information in the array to be looked up causes a cache miss.

21. The computer-program product of claim 18, wherein the instructions for invoking of the plurality of lookup operations includes instructions for invoking more than two lookup operations during the performance of each instance of the sequence of operations.

22. The computer-program product of claim 18, including:
  instructions for selecting N starting points within the array, where N is an integer greater than 1;
  instructions for invoking N lookup operations to access information in the array, the N lookup operations are mutually independent operations and the plurality of main memory accesses required to perform the N lookup operations are performed during overlapping time periods;
  instructions for performing N decoding operations using results of the N lookup operations;
  instructions for identifying a new set of N lookup operations based on results of the N decoding operations; and
  repeating the instructions of invoking, decoding and identifying a plurality of times.

23. The computer-program product of claim 18, wherein the encoded data includes a plurality of distinct sets of data.

24. A computer system for decoding data, comprising:
  a main memory;
  a processor with a cache memory; and
  at least one program, stored in the main memory and executed by the processor, the at least one program including instructions for accessing information in an array to decode a set of encoded data and produce a set of decoded data, including instructions for performing a sequence of operations a plurality of times, the instructions for the sequence of operations including:
    instructions for invoking a plurality of lookup operations to access information in the array, wherein the plurality of lookup operations are mutually independent operations, and wherein the invoking instructions perform a plurality of main memory accesses during overlapping time periods when at least two of the lookup operations result in cache misses;
    instructions for performing a respective plurality of decoding operations using results of the plurality of lookup operations; and
    instructions for identifying a new plurality of lookup operations based on results of the plurality of decoding operations.

25. The computer system of claim 24, including instructions for generating the array of information in the program.

26. The computer system of claim 24, wherein the instructions for each respective lookup operation of the plurality of invoked lookup operations cause a main memory access of the plurality of main memory accesses when the information in the array to be looked up causes a cache miss.

27. The computer system of claim 24, wherein the instructions for invoking the plurality of lookup operations include instructions for invoking more than two lookup operations during the performance of each instance of the sequence of operations.

28. The computer system of claim 24, the at least one program including:
  instructions for selecting N starting points within the array, where N is an integer greater than 1;
  instructions for invoking N lookup operations to access information in the array, wherein the N lookup operations are mutually independent operations, and wherein the instructions for invoking N lookup operations including instructions for performing at least two main memory accesses during overlapping time periods when at least two of the N lookup operations result in cache misses;
  instructions for performing N decoding operations using results of the N lookup operations;
  instructions for identifying a new set of N lookup operations based on results of the N decoding operations; and
  repeating the instructions of invoking, decoding and identifying a plurality of times.

29. The computer system of claim 24, wherein the encoded data includes a plurality of distinct sets of data.

30. A computer system for decoding data, comprising:
  a means for accessing information in an array to decode a set of encoded data and produce a set of decoded data, including a means for performing a sequence of operations in a program stored in a main memory a plurality of times, the means for performing the sequence of operations including:

means for selecting N starting points within the array, where N is an integer greater than 1;

means for invoking N lookup operations to access information in the array, wherein the N lookup operations are mutually independent operations, and wherein the means for invoking N lookup operations includes means for performing at least two main memory accesses from the main memory during overlapping time periods when at least two of the N lookup operations result in cache misses;

means for performing N decoding operations using results of the N lookup operations; and means for identifying a new set of N lookup operations based on results of the N decoding operations.

* * * * *